June 24, 1969      W. L. GRIFFITH      3,451,598
MACHINE FOR APPLYING HIGH CONSISTENCY FLUIDS AND SEMISOLIDS
Filed May 31, 1967
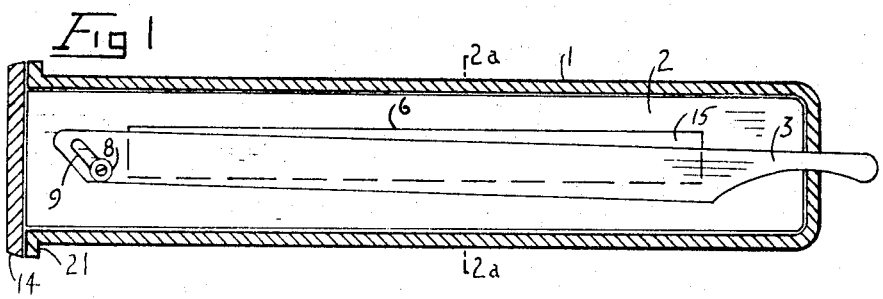
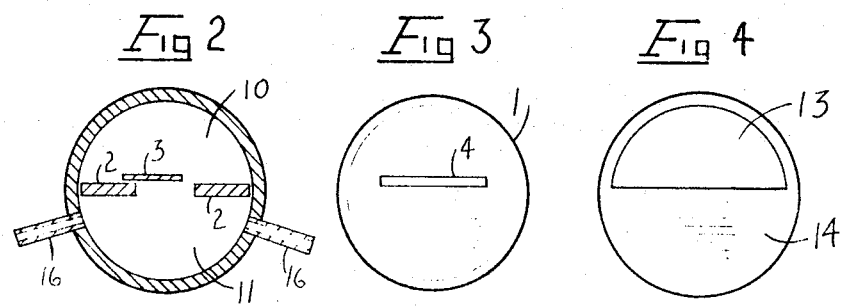
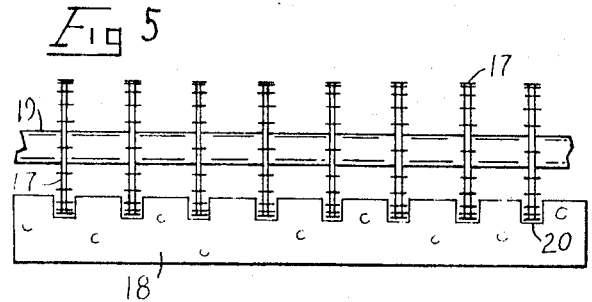
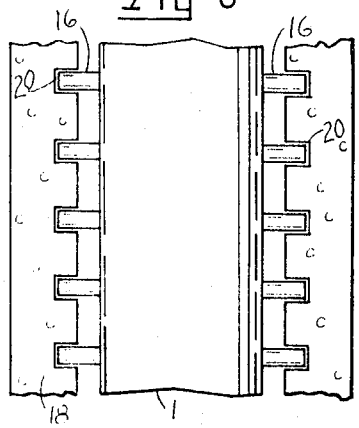
Inventor:
Walter L. Griffith

United States Patent Office 3,451,598
Patented June 24, 1969

3,451,598
MACHINE FOR APPLYING HIGH CONSISTENCY FLUIDS AND SEMISOLIDS
Walter L. Griffith, 77 Lenox St.,
Rochester, N.Y. 14611
Filed May 31, 1967, Ser. No. 643,810
Int. Cl. B67d 3/00; A23g 3/20; B05c 5/00
U.S. Cl. 222—485   3 Claims

ABSTRACT OF THE DISCLOSURE

A tubular dispensing valve having a valved longitudinal partition. High consistency fluids are pumped into the tube above the partition and flow through the opening in the partition and out a plurality of nozzles in the tube located below the partition. Cutting blades are also disclosed for cutting furrows in an article prior to depositing the fluid.

---

This invention relates to improvements in apparatus for applying high consistency fluids and semi-solids on bakery products or other products or articles and is particularly concerned with a system which operates to deposit such fluids and semi-solids uniformly and in such a manner as to make processing, wrapping or packaging both easy and immediate. The dispensing apparatus can be adjusted to compensate for variations in the characteristics of the fluids and semi-solids being used due to temperature and/or pressure changes, and it can be adjusted to compensate for a wide range of different viscosities and densities of various high consistency fluids and semi-solids. Further, it can be easily adjusted while in operation to vary the volume of flow.

In an adjustable valve for dispensing high consistency fluids and semi-solids the present art limits to some degree the number of discharge nozzles having equal flow. With this improvement there is theoretically no limit. In addition, this invention sets forth a new apparatus of buttering bread. Further, it is a method that lends itself to precise portion control.

It is possible with these improvements to butter bread in such a manner that it can be handled, packaged and transported like ordinary bread. In addition, it can be toasted, having unusual eye appeal.

The invention as disclosed herein in one of its embodiments comprises an apparatus using a moving conveyor belt or bed upon which a succession of bakery goods or other products or articles is continuously advanced and upon which a high consistency fluid or semi-solid is to be deposited. The articles pass through a sulcating machine which cuts furrows in the articles the desired distance apart and to the desired depth, then continues beneath a novelly constructed dispensing valve which has nozzles that deposit material in each furrow continuing on to be further processed or wrapped. In this disclosure bread and butter are the selected means for explaining the invention, with the bread being of the square sandwich variety passing continuously through the machine.

The sulcating machine in this invention is constructed thusly: Using a rotary powered keyway shaft, small saw blades are positioned along the shaft the desired distance apart, and are secured in place by insertion of the key. The width of each furrow is regulated by the width of the saw blade. Depending upon the thickness of the blade, it is possible to vary the furrow in width from an incision on up. The number of blades coincides with the number of nozzles being used. The depth of the furrow is regulated by raising or lowering the belt or bed upon which the articles are advanced. Pins protruding through the belt or bed hold the articles securely.

The dispensing valve in this invention is constructed thusly: A valve housing consisting of tubing that is sealed at one end except as hereinafter noted, with a divider dividing the internal area along the longitudinal axis creating two chambers, an inlet chamber and an outlet chamber, the divider being in substantial sealing engagement with the housing. Intermediate the divider's ends is a rectangular aperture running generally parallel to the longitudinal axis of the tube. An adjustable flow regulator is positioned to restrict or increase the flow through the rectangular aperture and is rotatably and adjustably attached to the divider at the inlet end. The opposite end of the flow regulator extends through a seal and slot in the end of the valve housing for external adjustment. Adjustment of the flow can be made by pushing in or pulling out the flow regulator and by movement along the slot. At the inlet end of the housing, flow is restricted to the inlet chamber causing the flow to proceed through the divider into the discharge or outlet chamber and through discharge nozzles constructed in the housing parallel to the longitudinal axis.

The present valve structure has associated with it a supply source and a pressure system to deliver a continuous supply of the selected substance.

It is therefore a primary object of the present invention to provide a valve arrangement that can subdivide the flow through the valve of high consistency fluids and semi-solids into equal smaller parts. Another object is to provide for a valve arrangement as described which can be adjusted to compensate for variable volume requirements, for changes in viscosity, pressure and/or temperature. It is further a primary object of this invention to present a practical method of buttering bread.

With the foregoing and other objects in view which will appear as the description proceeds, this invention consists of certain novel features of construction, arrangement and combination of parts hereinafter fully described, illustrated in the accompanying drawings, and particularly pointed out in the appended claims, it being fully understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, its construction, assembly and operation, and its advantages, should be readily understood.

Referring to the drawings in which the same characters of reference are employed to indicate corresponding or similar parts throughout the several figures of the drawings:

FIG. 1 is a longitudinal sectional view of the valve structure.

FIG. 2 is an end sectional view taken on line 2a showing in addition the discharge nozzles, one row of which is inoperative for conveyor belt operation.

FIG. 3 is an end view showing the flow regulator adjustment slot.

FIG. 4 shows the disc that is inserted in the inlet end of valve.

FIG. 5 illustrates the sulcating device with the sulcated product underneath.

FIG. 6 is a partial view of the valve with the nozzles in position to deposit material into the sulcated products on both sides of the valve.

The inner valve structure FIG. 1 has a hollow tubular housing 1 which is sealed at one end and open at its opposite end and having a divider 2 with a rectangular aperture 6 intermediate its ends. This aperture 6 in the divider 2 is adjustably restricted by a flow regulator 3, which is secured rotatably to the divider 2 by the attachment 8 at the inlet end of the divider and protrudes through the end of the valve 1 via the slot 4. The flow regulator 3 is further adjustable transversely of the longitudinal axis by means of a slot 9 that is constructed obliquely in the inlet end of the flow regulator, being secured to the divider 2 by the aforementioned attachment 8. By adjusting the handle of the flow regulator 3, a greater or lesser area of the rectangular aperture 6 is exposed, therefore varying the volume of flow.

The divider 2 creates two chambers 10 and 11 in the housing 1, an inlet chamber 10 and an outlet chamber 11. Material flow is directed into the inlet chamber 10 by the disk 14 at the inlet end of the housing 1 through the opening 13 in the disk. The lower portion of the disk 14 concurrently seals the end of outlet or discharge chamber 11. Material continues through the open portion 15 of the rectangular aperture 6 into the discharge chamber 11 and out through the nozzles 16 in the housing 1. The flange 21 on the housing 1 retains a nut (not illustrated) that attaches the left or open end of the housing 1 and the surrounding area of the disk 14 in fixed and sealing engagement with a supply line (not illustrated) for forcing a product under pressure into the valve.

FIGURE 5 shows a rotatable powered shaft 19 which has saw blades 17 positioned above the material a suitable distance, making furrows 20.

While the present disclosure is concerned mainly with a simple conveyor belt type operation and the use of only one bank of nozzles, FIG. 6 illustrates a more sophisticated application showing products 18 passing both sides of the valve.

What I claim and desire to secure by Letters Patent of the United States is:

1. A valve structure comprising a hollow valve housing having a cylindrical internal surface being sealed at one end and having an inlet end adapted to be connected to a supply source under pressure, with said valve having a divider dividing the internal area along the longitudinal axis and being in substantial sealing engagement with the valve housing creating an inlet chamber and a discharge chamber, said inlet end of said valve having a disc with an aperture allowing egress to said inlet chamber, said disc sealing the end of said discharge chamber, said divider having a triangular aperture intermediate its ends of predetermined area and length, having its apex at the said inlet end of said divider, said housing having discharge means capability located along lines running generally parallel to the longitudinal axis communicating between the interior and exterior of said discharge chamber.

2. A valve structure comprising a hollow valve housing having a cylindrical internal surface being sealed at one end and having an inlet end adapted to be connected to a supply source under pressure, with said valve having a divider dividing the internal area along the longitudinal axis and being in substantial sealing engagement with the valve housing creating an inlet chamber and a discharge chamber, said inlet end of said valve having a disc with an aperture allowing egress to said inlet chamber, said disc sealing the end of said discharge chamber, said divider having a generally rectangular aperture of predetermined length and width intermediate its ends, having an adjustable flow regulator located in said inlet chamber comprising a flat strip movable in a plane parallel to and adjacent to said divider so as to vary the configuration of said rectangular aperture and being rotatably attached at said inlet end of said rectangular aperture and extending through a seal and slot in said sealed end of said valve housing, said housing having discharge means capability located along lines running generally parallel to the longitudinal axis communicating between the interior and exterior of said discharge chamber.

3. A valve structure comprising a hollow valve housing having a cylindrical internal surface being sealed at one end and having an inlet end adapted to be connected to a supply source under pressure, with said valve having a divider dividing the internal area along the longitudinal axis and being in substantial sealing engagement with the said valve housing, creating an inlet chamber and a discharge chamber, said inlet end of said valve having a disc with an aperture allowing egress to said inlet chamber, said disc sealing the end of said discharge chamber, said divider having a generally rectangular aperture intermediate its ends of predetermined length and width, having an adjustable flow regulator comprising a flat strip having a slotted opening in the inlet end constructed at an oblique angle, said strip movable in a plane parallel to and adjacent to said divider, being adjustable rotatably, and transversely of the longitudinal axis of said divider from a slotted connection to said divider located at the inlet end of said rectangular aperture, said strip extending through a seal and slot in said sealed end of said valve housing, said housing having discharge nozzles located along lines running generally parallel to the longitudinal axis communicating between the interior and the exterior of said discharge chamber.

References Cited
UNITED STATES PATENTS 1,565,887 12/1925 Andrus _____ 107—8
3,246,810  4/1966 Griffith _____ 222—485

WALTER A. SCHEEL, *Primary Examiner.*

J. P. McINTOSH, *Assistant Examiner.*

U.S. Cl. X.R.
118—15, 24